(12) United States Patent
Shikama

(10) Patent No.: US 11,796,832 B1
(45) Date of Patent: Oct. 24, 2023

(54) ANTI-VIBRATION DEVICE AND CAMERA DEVICE

(71) Applicant: Changzhou AAC Raytech Optronics Co., Ltd., Changzhou (CN)

(72) Inventor: Kazuo Shikama, Osaka (JP)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 42 days.

(21) Appl. No.: 17/726,554

(22) Filed: Apr. 22, 2022

(30) Foreign Application Priority Data

Mar. 31, 2022 (JP) .................................. 2022-060630

(51) Int. Cl.
*G02B 27/64* (2006.01)
*G03B 13/36* (2021.01)
*H04N 23/68* (2023.01)

(52) U.S. Cl.
CPC .......... *G02B 27/648* (2013.01); *G03B 13/36* (2013.01); *H04N 23/687* (2023.01)

(58) Field of Classification Search
CPC ..... G02B 27/648; G03B 13/36; H04N 23/687
See application file for complete search history.

(56) References Cited

U.S. PATENT DOCUMENTS

| | | | | |
|---|---|---|---|---|
| 5,850,576 A | * | 12/1998 | Matsuzawa | G03B 5/00 359/554 |
| 7,450,153 B2 | * | 11/2008 | Akada | H04N 23/68 348/374 |
| 7,460,775 B2 | * | 12/2008 | Umezu | G03B 17/02 359/557 |
| 8,564,675 B2 | * | 10/2013 | Sato | H04N 23/687 348/208.7 |
| 11,595,553 B2 | * | 2/2023 | Sugawara | G03B 3/10 |

* cited by examiner

*Primary Examiner* — Robert E. Tallman
(74) *Attorney, Agent, or Firm* — W&G Law Group

(57) ABSTRACT

Provided is an anti-vibration device, including a housing, a base fixed to the housing, and an anti-vibration mechanism accommodated in the housing. The anti-vibration mechanism includes a lens, a rolling member, a movable frame, an image sensor, and an electric actuator. The electric actuator includes a coil and a magnet, and the magnet and the coil are arranged opposite to each other to actuate the movable frame to drive the image sensor to move along the first direction and the second direction orthogonal to the optical axis. The anti-vibration mechanism adopts two coils arranged at intervals along the first direction two coils arranged at intervals along the second direction, so that the electric actuator drives the image sensor to rotate in the plane of the first direction and the second direction, which helps to improve the shooting effect.

12 Claims, 12 Drawing Sheets

ANTI-VIBRATION DEVICE AND CAMERA DEVICE

TECHNICAL FIELD

The present disclosure relates to an anti-vibration device and a camera device.

BACKGROUND

Anti-vibration devices have been widely used in the related art, for example, in portable electronic devices such as smart phones and tablet computers, and these products are also accepted by consumers. Existing anti-vibration device is generally composed of an auto-focus mechanism that adjusts a focus in an optical axis direction and a camera shake correction mechanism that moves in a plane orthogonal to the optical axis direction. The current camera shake correction mechanism can only realize straight travel adjustment in the plane, but cannot deal with rotation caused by a photographer's hand shake, which may adversely affect the anti-shake performance of the anti-vibration device, resulting in poor quality of the captured image.

Therefore, it is necessary to provide a new anti-vibration device to solve the above problem.

SUMMARY

An object of the present disclosure is to provide an anti-vibration device and an camera device capable of realizing anti-vibration functions in multiple directions.

The technical solutions of the present disclosure are as follows.

An anti-vibration device, including a housing; a base fixed to the housing; and an anti-vibration mechanism accommodated within the housing. The anti-vibration mechanism includes: a lens mounted on the housing; a rolling member for the anti-vibration mechanism carried on the base; a movable frame for the anti-vibration mechanism movably supported on the base via the rolling member for the anti-vibration mechanism; an image sensor attached to the movable frame for the anti-vibration mechanism; and an electric actuator including a coil for the anti-vibration mechanism attached to the movable frame for the anti-vibration mechanism, and a magnet for the anti-vibration mechanism attached to the base. The magnet for the anti-vibration mechanism is arranged corresponding to the coil for the anti-vibration mechanism to actuate the movable frame for the anti-vibration mechanism to drive the image sensor to move along a first direction and a second direction that are orthogonal to an optical axis, and the first direction is perpendicular to the second direction. The coil for the anti-vibration mechanism includes two coils for a first anti-vibration mechanism arranged at intervals along the first direction and two coils for a second anti-vibration mechanism arranged at intervals along the second direction. The movable frame for the anti-vibration mechanism has a first axis parallel to the first direction, geometric centers of the coils for the first anti-vibration mechanism are spaced from the first axis, and two coils for the first anti-vibration mechanisms are in central symmetry with respect to the first axis. The movable frame for the anti-vibration mechanism has a second axis parallel to the second direction, geometric centers of the coils for the second anti-vibration mechanism are spaced from the second axis, and two coils for the second anti-vibration mechanisms are in central symmetry with respect to the second axis, so that the electric actuator drives the image sensor to rotate in a plane of the first direction and the second direction.

As an improvement, the magnet for the anti-vibration mechanism includes a magnet for the first anti-vibration mechanism arranged corresponding to the coil for the first anti-vibration mechanism, and a magnet for the second anti-vibration mechanism arranged corresponding to the coil for the second anti-vibration mechanism. The electric actuator further includes a yoke for the anti-vibration mechanism arranged on one side of the movable plate for the anti-vibration mechanism close to the coil for the anti-vibration mechanism and arranged opposite to the magnet for the first anti-vibration mechanism and the magnet for the second anti-vibration mechanism.

As an improvement, a first groove is provided on one surface of the base facing the movable frame for the anti-vibration mechanism, a second groove corresponding to the first groove is provided on one surface of the movable frame for the anti-vibration mechanism facing the base, and the rolling member for the anti-vibration mechanism is located in an accommodating space formed by the first groove and the second groove.

As an improvement, the anti-vibration mechanism further includes two detection elements for the anti-vibration mechanism fixed to the movable frame for the anti-vibration mechanism, and the two detection elements for the anti-vibration mechanism are respectively arranged opposite to the magnet for the first anti-vibration mechanism and the magnet for the second anti-vibration mechanism.

As an improvement, the anti-vibration mechanism further includes a flexible substrate for the anti-vibration mechanism, and the flexible substrate for the anti-vibration mechanism is configured to electrically connect the image sensor to an external circuit.

As an improvement, the anti-vibration mechanism further includes a conductive support plate fixed to one side of the movable frame for the anti-vibration mechanism facing the base, and the coils for the anti-vibration mechanism and the detection elements for the anti-vibration mechanism are mounted on the conductive support plate.

As an improvement, the conductive support plate is electrically connected to the flexible substrate for the anti-vibration mechanism through the movable frame for the anti-vibration mechanism to electrically connect the coils for the anti-vibration mechanism to an external circuit.

As an improvement, projections of the detection element for the anti-vibration mechanism and of adjacent coils for the first anti-vibration mechanism along a direction of the optical axis are spaced apart from each other and fall within a projection of the magnet for the first anti-vibration mechanism along the direction of the optical axis. Projections of the detection element for the anti-vibration mechanism and of adjacent coils for the second anti-vibration mechanism along a direction of the optical axis are spaced apart from each other and fall within a projection of the magnet for the second anti-vibration mechanism along the direction of the optical axis.

A camera device, including an anti-vibration device and a focus adjustment mechanism. The lens is mounted on the focus adjustment mechanism, and the anti-vibration device is the aforementioned anti-vibration device. The anti-vibration mechanism in the anti-vibration device is located on an image side of the lens.

As an improvement, the focus adjustment mechanism is an auto-focus mechanism provided with a base for the auto-focus mechanism and a bracket for auto focus that is movably connected to the base for the auto-focus mechanism. The lens is mounted on the bracket for auto focus, so that the bracket for auto focus drives the lens to move in the direction of the optical axis.

As an improvement, the focus adjustment mechanism is a zoom mechanism, the lens includes at least two lens pieces arranged at intervals along the direction of the optical axis, and the zoom mechanism is capable of changing a distance between any two lens pieces along the direction of the optical axis.

As an improvement, the camera device further includes a first prism on an object side of the lens and/or a second prism on an image side of the lens, and the first prism and the second prism are configured to change a direction of a light path.

The beneficial effects of the present disclosure are as follows: the anti-vibration mechanism can realize anti-shake functions in multiple directions in a plane orthogonal to the optical axis, thereby helping to improve the anti-shake performance of the anti-vibration device, thereby improving the shooting effect.

It is to be understood that the foregoing general description and the following detailed description are exemplary only and do not limit the present disclosure.

Reference Signs

Figure 1:
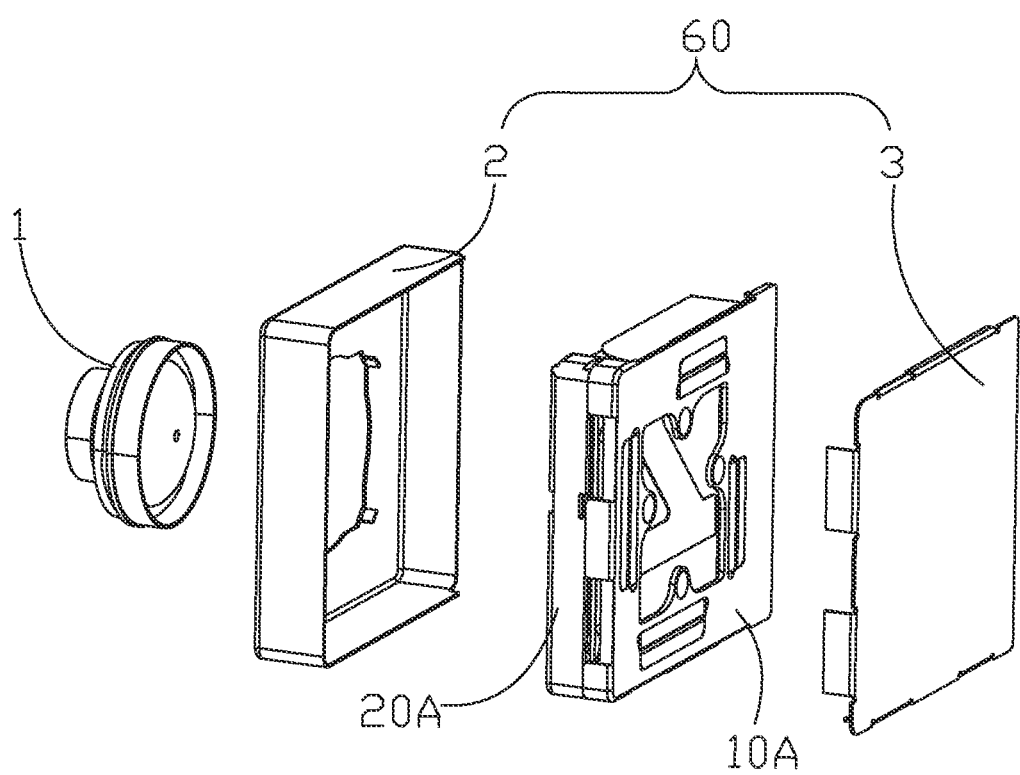
FIG. 1 is a schematic diagram of a housing of an anti-vibration device according to an embodiment of the present disclosure.
Figure 2:
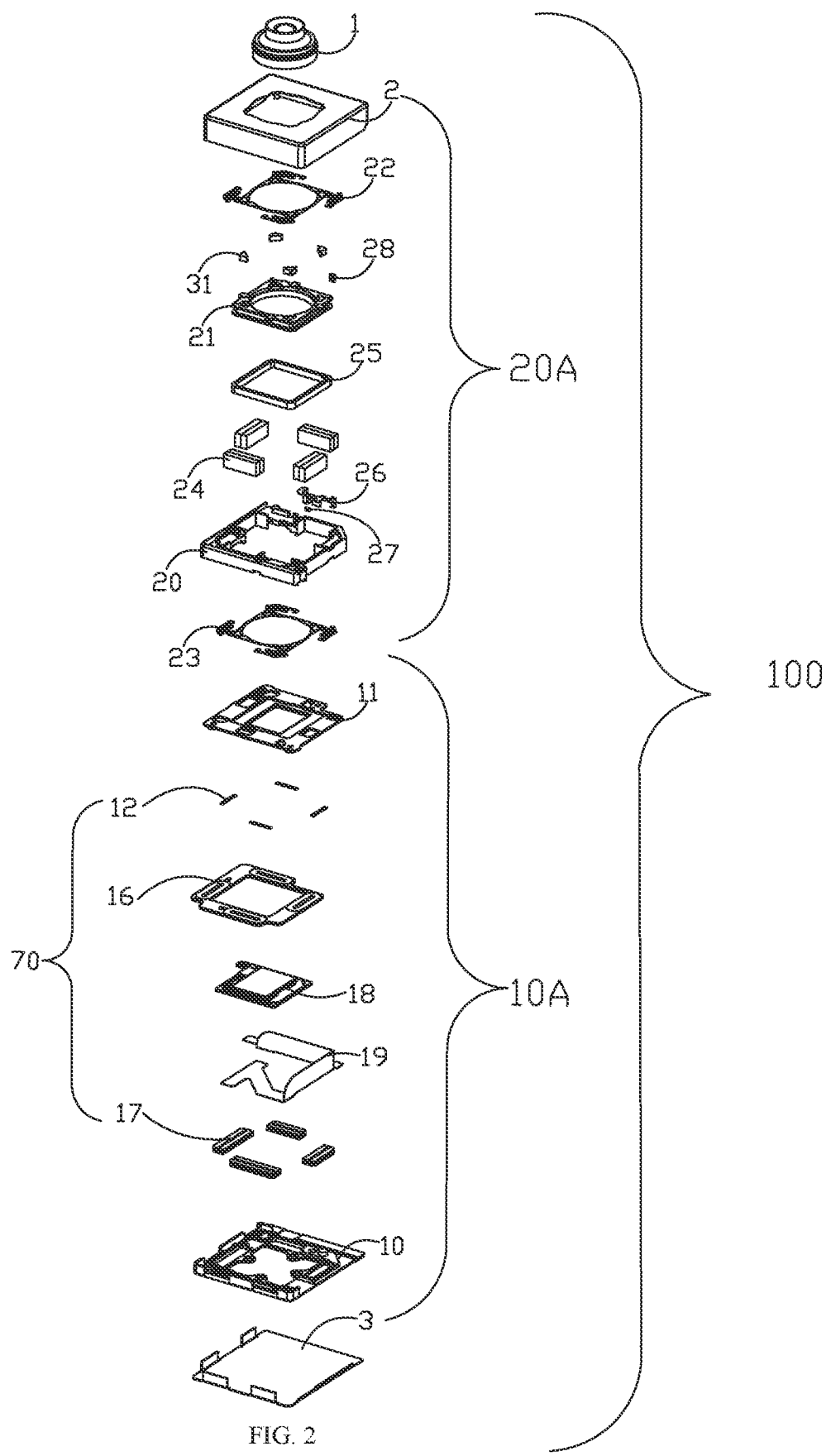
FIG. 2 is an exploded perspective view of an anti-vibration device according to an embodiment of the present disclosure.

1—lens;
2—housing for auto focus;
2-1—claw member;
3—housing for anti-vibration mechanism;
10A—anti-vibration mechanism;
10—base;
   101—first groove;
11—movable frame for anti-vibration mechanism;
   111—first axis;
   112—second axis;
   113—second groove;
12—yoke for anti-vibration mechanism;
13—support plate for first anti-vibration mechanism;
14—rolling member for anti-vibration mechanism;
15—support plate for second anti-vibration mechanism;
16—coil for anti-vibration mechanism;
   16-1—coil for first anti-vibration mechanism;
   16-2—coil for second anti-vibration mechanism;
   16-3—detection element for anti-vibration mechanism;
   16-4—conductive support plate;
17—magnet for anti-vibration mechanism;
   17-1—magnet for first anti-vibration mechanism;
   17-2—magnet for second anti-vibration mechanism;
18—image sensor;
19—flexible substrate for anti-vibration mechanism;
   19-1—first curved surface;
   19-2—second curved surface;
20A—auto-focus mechanism;
20—base for auto focus;
21—bracket for auto focus;
22—upper leaf spring for auto focus;
23—lower leaf spring for auto focus;
24—magnet for auto focus;
25—coil for auto focus;
26—power-on flexible substrate for auto focus;
27—position detection element for auto focus;
28—position detection magnet for auto focus;
30—shock-absorbing gel for first anti-vibration mechanism;
31—shock-absorbing gel for auto focus;
32—shock-absorbing gel for second anti-vibration mechanism;
40—optical axis;
50—zoom mechanism;
60—housing;
70—electric actuator;
80—first prism;
90—second prism;
100—anti-vibration device.

The accompanying drawings incorporated herein illustrate examples of the present disclosure and serve to explain the principles of the present disclosure together with the description.

DESCRIPTION OF EMBODIMENTS

The present disclosure will be further described below with reference to the accompanying drawings and embodiments.

The terms used in the embodiments of the present disclosure are only for the purpose of describing specific embodiments, and are not intended to limit the present disclosure. As used in the embodiments of the present disclosure and the appended claims, the singular forms "a", "an", "the" and "said" are intended to include the plural forms as well, unless the context clearly dictates otherwise.

It should be understood that the term "and/or" used in this document is only an association relationship to describe the associated objects, indicating that there may be three kinds of relationships, for example, An and/or B may indicate that A exists alone, B exists alone, and An and B exist at the same time. In addition, the character "/" in this document generally indicates that the related objects are an "or" relationship.

It should be noted that the directional words such as "above", "below", "left", "right" described in embodiments of the present disclosure are described from the perspectives shown in the drawings, and should not be construed as implementing the present disclosure. In this context, it should also be understood that when an element is referred to as being "above" or "below" another element, it may be directly connected "above" or "below" the other element, or indirectly connected "above" or "below" another element through intervening elements.

As shown in FIGS. 1 to 9, an embodiment of the present disclosure provides an anti-vibration device 100, which includes a housing 60, a base 10 fixed to the housing 60, and an anti-vibration mechanism 10An accommodated in the housing 60. The anti-vibration mechanism 10A includes a lens 1, a rolling member 14 for the anti-vibration mechanism, a movable frame 11 for the anti-vibration mechanism, an image sensor 18, and an electric actuator 70. The lens 1 is mounted on the housing 60, and the movable frame 11 for the anti-vibration mechanism is supported on the base 10 by the rolling member 14. The movable frame 11 for the anti-vibration mechanism is movably supported on the base 10 by the rolling members 14 for the anti-vibration mechanism. The image sensor 18 is attached to the movable frame 11 for the anti-vibration mechanism. The electric actuator 70 includes an coil 16 for the anti-vibration mechanism attached to the movable frame 11 for the anti-vibration mechanism, an magnet 17 for the anti-vibration mechanism attached to the base 10. The magnet 17 for the anti-vibration mechanism and the coil 16 for the anti-vibration mechanism are arranged opposite to each other to drive the movable frame 11 for the anti-vibration mechanism and thus to drive the image sensor 18 to move along the first direction X and the second direction Y orthogonal to the optical axis 40. The first direction X is perpendicular to the second direction Y. The coils for the anti-vibration mechanism uses include two coils 16-1 for the first anti-vibration mechanism arranged at intervals along the first direction X and two coils 16-2 for the second anti-vibration mechanism arranged at intervals along the second direction Y The movable frame 11 for the anti-vibration mechanism has a first axis 111 parallel to the first direction X, the geometric center of the coil 16-1 for the first anti-vibration mechanism is spaced from the first axis 111, and the two coils 16-1 for the first anti-vibration mechanism are in central symmetry relative to the first axis 111. The movable frame 11 for the anti-vibration mechanism has a second axis 112 parallel to the second direction Y, the geometric center of the coil 16-2 for the second anti-vibration mechanism is spaced from the second axis 112, and the two coils 16-2 for the second anti-vibration mechanism are in central symmetry relative to the second axis 112. As a result, the electric actuator 70 drives the image sensor 18 to rotate in the plane of the first direction X and the second direction Y.

The anti-vibration device 100 includes a housing, a base 10 and an anti-vibration mechanism 10 A. The housing 60 may include a housing 3 for the anti-vibration mechanism and a housing 2 for auto focus, and the base 10 can be fixedly installed on the housing 3 for the anti-vibration mechanism. The housing 60 has an accommodation space, and the anti-vibration mechanism 10A can be located in the accommodation space of the housing 60. The anti-vibration mechanism includes a lens 1, a rolling member 14 for the anti-vibration mechanism, a movable frame 11 for the anti-vibration mechanism, an image sensor 18, and an electric actuator 70. The lens 1 is attached to the housing 60, and the image sensor 18 is attached to the movable frame 11 for the anti-vibration mechanism. Light beam can irradiate into the lens 1 along the optical axis 40 and can be imaged on the image sensor 18. The rolling member 14 for the anti-vibration mechanism can be a sphere, the rolling member 14 for the anti-vibration mechanism is carried on the base 10, and can roll relative to the base 10. The movable frame 11 for the anti-vibration mechanism can be movably supported on the base 10 through the rolling member 14 for the anti-vibration mechanism. That is, the rolling member 14 for the anti-vibration mechanism can support the movable frame 11 for the anti-vibration mechanism and, at the same time, the movable frame 11 for the anti-vibration mechanism can slide relative to the rolling member 14 for the anti-vibration mechanism, so that the movable frame 11 for the anti-vibration mechanism can relatively slide with respect to the base 10.

The electric actuator 70 includes an coil 16 for the anti-vibration mechanism and an magnet 17 for the anti-vibration mechanism. The coil 16 for the anti-vibration mechanism is attached to the movable frame 11 for the anti-vibration mechanism and can move together with the movable frame 11 for the anti-vibration mechanism. The magnet 17 for the anti-vibration mechanism is fixedly installed on the base 10, and the magnet 17 for the anti-vibration mechanism and the coil 16 for the anti-vibration mechanism can be arranged opposite to each other, so that when the electric actuator 70 is energized, the magnet 17 for the anti-vibration mechanism and the coil 16 for the anti-vibration mechanism can drive the movable frame 11 for the anti-vibration mechanism to move in a direction orthogonal to the optical axis 40. Under the action of the electric actuator 70, the movable frame 11 for the anti-vibration mechanism can move along the first direction X and the second direction Y, and the first direction X is perpendicular to the second direction Y. Since the rolling member 14 for the anti-vibration mechanism is provided between the movable frame 11 for the anti-vibration mechanism and the base 10, when the electric actuator 70 is energized, the movable frame 11 for the anti-vibration mechanism can move relative to the base 10 along the first direction X and the second direction Y The coil 16 for the anti-vibration mechanism includes two coils 16-1 for the first anti-vibration mechanism and two coils 16-2 for the second anti-vibration mechanism. The two coils 16-1 for the first anti-vibration mechanism are arranged at intervals along the first direction X, and the two coils 16-2 for the second anti-vibration mechanism are arranged at intervals along the second direction Y. The movable frame 11 for the anti-vibration mechanism has a first axis 111 along the first direction X and a second axis 112 along the second direction Y, and the first axis 111 is perpendicular to the second axis 112. The geometric centers of the two coils 16-1 for the first anti-vibration mechanism are spaced apart from the first axis 111, and the intervals are respectively d1 and d2, and the two coils 16-1 for the first anti-vibration mechanism are in central symmetry with respect to the first axis 111.

That is, the distances d1 and d2 are equal. Similarly, the geometric centers of the two coils 16-2 for the second anti-vibration mechanism are spaced apart from the second axis 112, and the intervals are respectively d3 and d4, and the two coils 16-2 for the second anti-vibration mechanism are in central symmetry with respect to the second axis 112. That is, the distances d3 and d4 are equal. The anti-vibration mechanism can independently control the coils 16-1 for the first anti-vibration mechanism and the coils 16-2 for the second anti-vibration mechanism. That is, only the coils 16-1 for the first anti-vibration mechanism can be energized or the coils 16-2 for the second anti-vibration mechanism can be energized, so that the movable frame 11 for the anti-vibration mechanism can rotate in the corresponding direction in a plane orthogonal to the optical axis 40. Taking the coils 16-1 for the first anti-vibration mechanism as an example, by controlling the direction of the current applied to the two coils 16-1 for the first anti-vibration mechanism, the directions of current flowing through the two coils 16-1 for the first anti-vibration mechanism are opposite to each other, thereby generating two forces in opposite directions. Since the geometric centers of the coils 16-1 for the first anti-vibration mechanism are spaced from the first axis 111, neither of the two forces acts on the first axis 111, but are distributed on both sides of the first axis 111, so that the movable frame 11 for the anti-vibration mechanism can rotate under the action of the two forces. Furthermore, the anti-vibration mechanism 10A can change the rotation direction of the movable frame 11 for the anti-vibration mechanism by changing the direction of the current, so that the movable frame 11 for the anti-vibration mechanism can be rotate in the plane orthogonal to the optical axis 40 clockwise and counterclockwise. When the movable frame 11 for the anti-vibration mechanism moves in the first direction X, the anti-vibration mechanism 10A can energize the coils 16-1 for the first anti-vibration mechanism, and when moves in the second direction Y, the anti-vibration mechanism 10A can energize the coils 16-2 for the second anti-vibration mechanism, so that through the action of the current and the magnetic field, the movable frame 11 for the anti-vibration mechanism can move straight in the first direction X and the second direction Y By arranging the anti-vibration mechanism 10A, it is beneficial to realize the anti-shake function of the anti-vibration device 100. The anti-vibration mechanism can be applied to a camera. Due to shake of the user's hand, the captured images may be blurred and unclear, by arranging the anti-vibration mechanism 10A, the movable frame 11 for the anti-vibration mechanism can drive the image sensor 18 to move, so that the shake can be corrected, thereby improving the shooting effect and improving the user's experience. When the user rotates the anti-vibration device 100 due to hand shaking, the anti-vibration mechanism 10A can perform a compensating action according to the actual situation. That is, the movable frame 11 for the anti-vibration mechanism rotates in a corresponding direction, so as to realize the anti-shake function of the anti-vibration device 100.

In the related art, the movable frame for the anti-vibration mechanism of the anti-vibration device can only perform straight movement in a plane, and cannot perform clockwise and counterclockwise rotation. Therefore, embodiments of the present disclosure can implement anti-shake functions in multiple directions in a plane orthogonal to the optical axis 40, thereby helping to reduce the adverse effects on the anti-vibration device 100 caused by the user's hand shaking, which is beneficial to improve the shooting effect. At the same time, through the design of the coil 16-1 for the first anti-vibration mechanism and the coil 16-2 for the second anti-vibration mechanism, it is beneficial to realize the anti-vibration of the anti-vibration device 100 without increasing the volume of the anti-vibration device 100, which is beneficial to realize the miniaturized design of the anti-vibration device 100.

Figure 4:
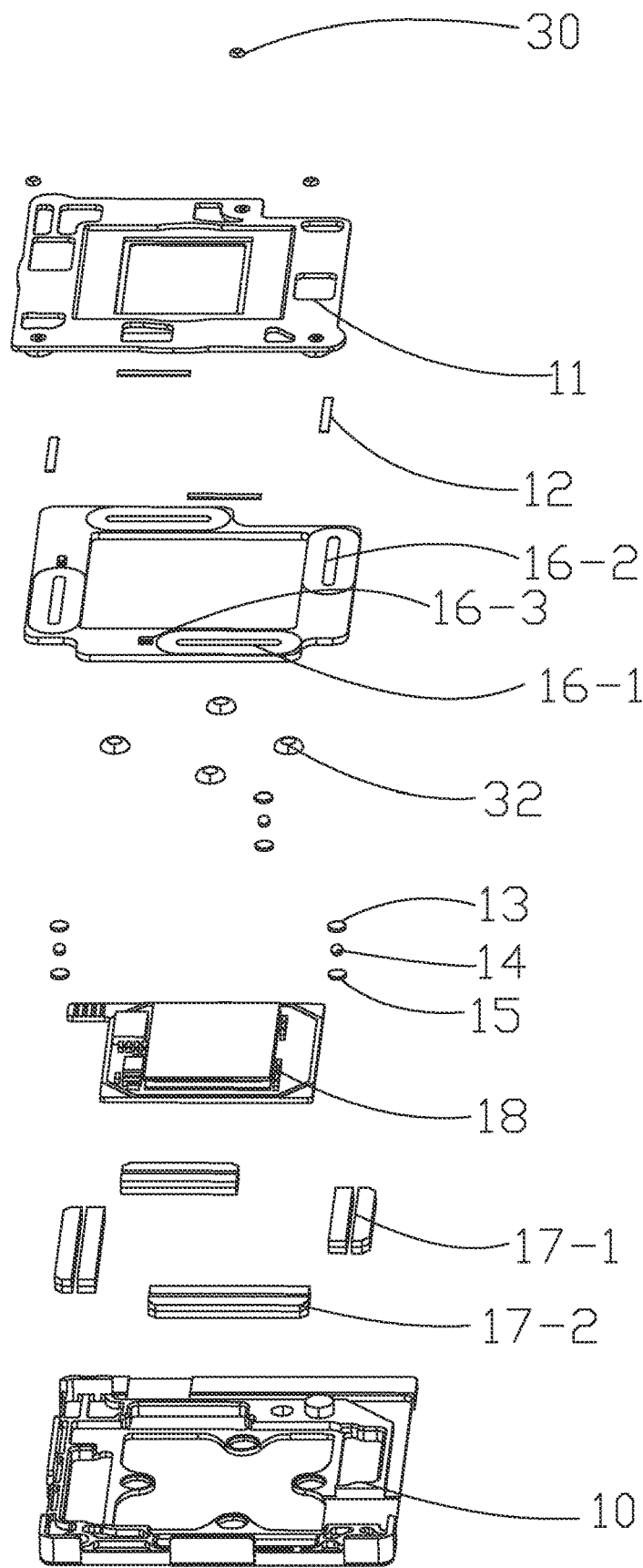
FIG. 4 is a partial exploded view of an anti-vibration mechanism according to an embodiment of the present disclosure.
Figure 6:
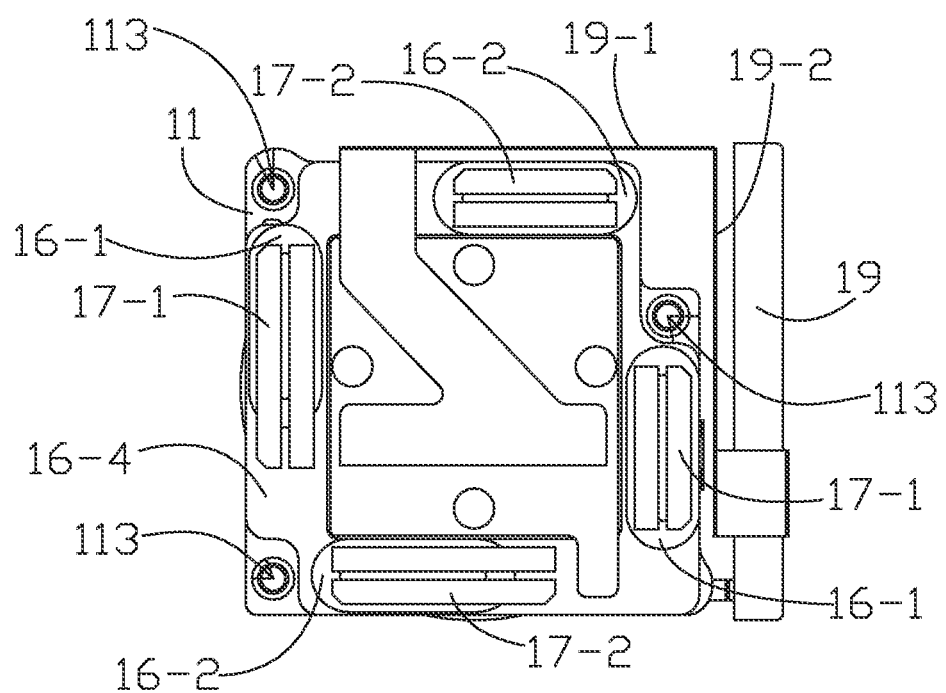
FIG. 6 is a schematic diagram of a coil of an anti-vibration mechanism and a magnet of an anti-vibration mechanism according to an embodiment of the present disclosure.

As shown in FIG. 4 and FIG. 6, in an embodiment, the magnet 17 for the anti-vibration mechanism includes a first magnet 17-1 for the anti-vibration mechanism, which is arranged opposite to the first coil 16-1 for an anti-vibration mechanism, and a second magnet 17-2 for the anti-vibration mechanism, which is provided opposite to the second coil 16-2 for the anti-vibration mechanism. The electric actuator 70 further includes a yoke 12 for the anti-vibration mechanism provided at one side of the movable frame 11 for the anti-vibration mechanism close to the coil 16 for the anti-vibration mechanism, and is provided opposite to the first and second magnets 17-1 and 17-2 for the anti-vibration-mechanism.

The magnet 17 for the anti-vibration mechanism includes two magnets 17-1 for the first anti-vibration mechanism and two magnets 17-2 for the second anti-vibration mechanism. The magnets 17-1 for the first anti-vibration mechanism are arranged corresponding to the coils 16-1 for the first anti-vibration mechanism, and the magnets 17-2 for the second anti-vibration mechanism are arranged corresponding to the coils 16-2 for the second anti-vibration mechanism. The electric actuator 70 further includes four yokes 12 for the anti-vibration mechanism. The yokes 12 for the anti-vibration mechanism are located on one side of the movable frame 11 for the anti-vibration mechanism close to the coil 16 for the anti-vibration mechanism. The yokes 12 for the anti-vibration mechanism can move together with the movable frame 11 for the anti-vibration mechanism. Two yokes 12 for the anti-vibration mechanism are arranged corresponding to the magnets 17-1 for the first anti-vibration mechanism, and the other two yokes 12 for the anti-vibration mechanism are corresponding to the magnets 17-2 for the second anti-vibration mechanism. That is, the yokes 12 for the anti-vibration mechanism are arranged along the circumferential direction of the movable frame 11 for the anti-vibration mechanism.

By providing the yoke 12 for the anti-vibration mechanism, the yoke 12 for the anti-vibration mechanism can interact with the magnet 17 for the anti-vibration mechanism, thereby facilitating the movable frame 11 for the anti-vibration mechanism being pulled toward the direction of the optical axis 40. At the same time, it is also beneficial to improve the stability of the movable frame 11 for the anti-vibration mechanism when moving. On the other hand, providing the yoke 12 for the anti-vibration mechanism helps to reduce the gap between the lens 1 and the anti-vibration mechanism 10A, thereby reducing the possibility of the image sensor 18 being inclined relative to the optical axis 40.

Figure 5:
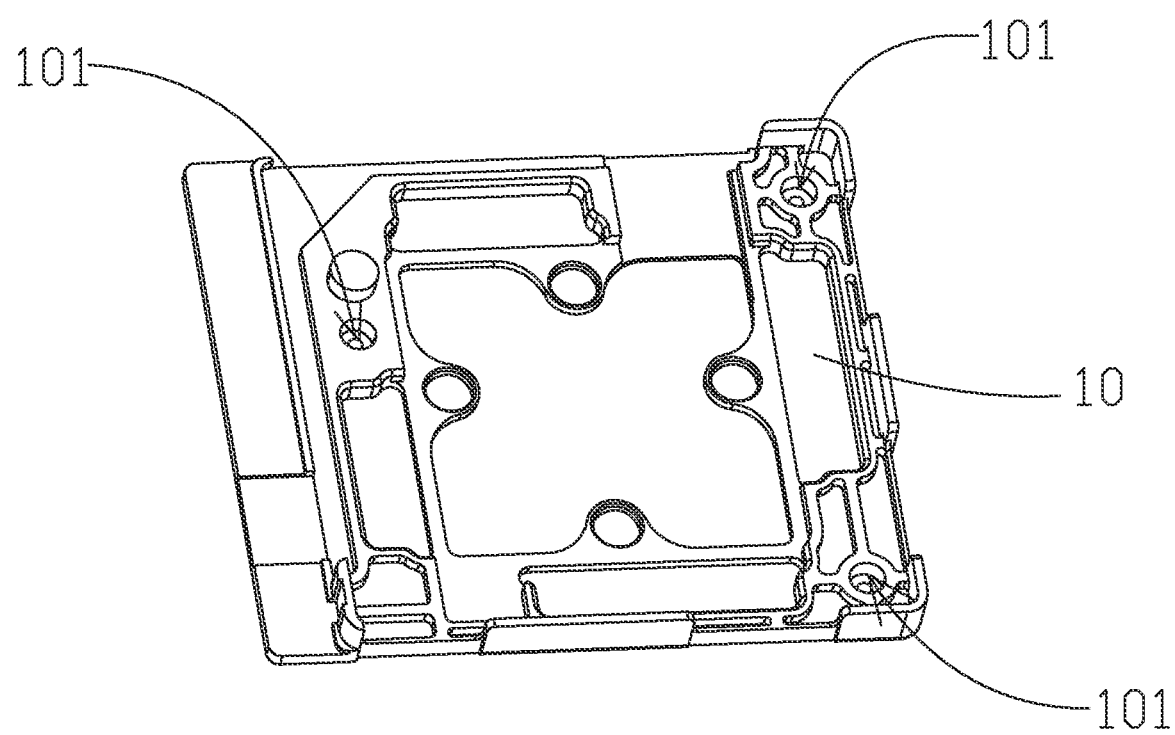
FIG. 5 is a schematic diagram of a base according to an embodiment of the present disclosure.

As shown in FIG. 5, in an embodiment, a first groove 101 is provided on one side of the base 10 facing the movable frame 11 for the anti-vibration mechanism, and one surface of the movable frame 11 for the anti-vibration mechanism facing the bottom of the base 10 is provided with a second groove 113 corresponding to the first groove 101. The rolling member 14 for the anti-vibration mechanism is located in the accommodating space formed by the first groove 101 and the second groove 113.

The rolling member 14 for the anti-vibration mechanism can be located in the accommodating space formed by the first groove 101 and the second groove 113, and roll in the accommodating space. The anti-vibration mechanism can also be provided with a support plate 13 for the first anti-vibration mechanism and a support plate 15 for the second anti-vibration mechanism. The support plate 13 for the first anti-vibration mechanism can be installed in the first groove 101, and the support plate 15 for the second anti-vibration mechanism can be installed in the second groove 113. The rolling member 14 for the anti-vibration mechanism is located between the support plate 13 for the first anti-vibration mechanism and the support plate 15 for the second anti-vibration mechanism, and can roll relative to the support plate 13 for the first anti-vibration mechanism and the support plate 15 for the second anti-vibration mechanism. By arranging the first groove 101 and the second groove 113, it is beneficial to limit the position of the rolling member 14 for the anti-vibration mechanism, and to reduce possibility of the rolling member 14 for the anti-vibration mechanism from disengaging from the base 10 and the movable frame 11 for the anti-vibration mechanism, which is beneficial to improve the movement stability of the movable frame 11 for the anti-vibration mechanism.

Figure 7:
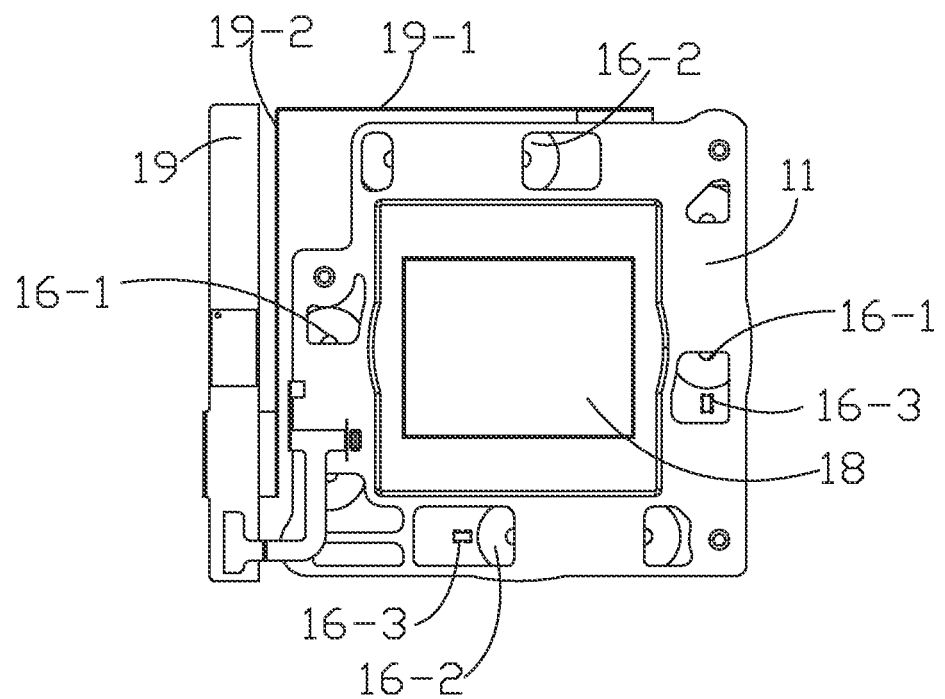
FIG. 7 is a schematic diagram of a detection element of an anti-vibration mechanism according to an embodiment of the present disclosure.

As shown in FIG. 6 and FIG. 7, in an embodiment, the anti-vibration mechanism 10A further includes two detection elements 16-3 for the anti-vibration mechanism fixed to the movable frame 11 for the anti-vibration mechanism. The two detection elements 16-3 for the anti-vibration mechanism are provided corresponding to the first and second magnets 17-1 and 17-2 for the anti-vibration mechanism, respectively.

The anti-vibration mechanism 10A may include at least two detection elements 16-3 for the anti-vibration mechanism, the detection elements 16-3 for the anti-vibration mechanism are mounted on the movable frame 11 for the anti-vibration mechanism, and the detection elements 16-3 for the anti-vibration mechanism are respectively arranged opposite to the magnet 17-1 for the first anti-vibration mechanism and the magnet 17-2 for the second anti-vibration mechanism. The detection element 16-3 for the anti-vibration mechanism is configured to detect the magnetic flux of the magnet 17 for the anti-vibration mechanism, thereby detecting relative position of movable frame 11 for the anti-vibration mechanism. The anti-vibration mechanism 10A may be provided with a circuit used by the detection element 16-3 for the anti-vibration mechanism, thereby facilitating the realization of the detection function of the detection element 16-3 for the anti-vibration mechanism.

By providing the detection element 16-3 for the anti-vibration mechanism, it is beneficial to realize the function of detecting the position of the movable frame 11 for the anti-vibration mechanism, which in turn facilitates the realization of the anti-vibration function of the anti-vibration mechanism 10A, and facilitates the control of the anti-vibration device 100 to the anti-vibration mechanism 10A.

As shown in FIGS. 6 and 7, in an embodiment, the anti-vibration mechanism 10A further includes a flexible substrate 19 for the anti-vibration mechanism, and the flexible substrate 19 for the anti-vibration mechanism is configured to electrically connect the image sensor 18 to the external circuit.

The flexible substrate 19 for the anti-vibration mechanism is provided with a first curved surface 19-1 and a second curved surface 19-2, and an included angle is formed between the first curved surface 19-1 and the second curved surface 19-2. The image sensor 18 can be electrically connected to an external circuit through the flexible substrate 19 for the anti-vibration mechanism, so as to transmit the signal of the image sensor 18.

Figure 3:
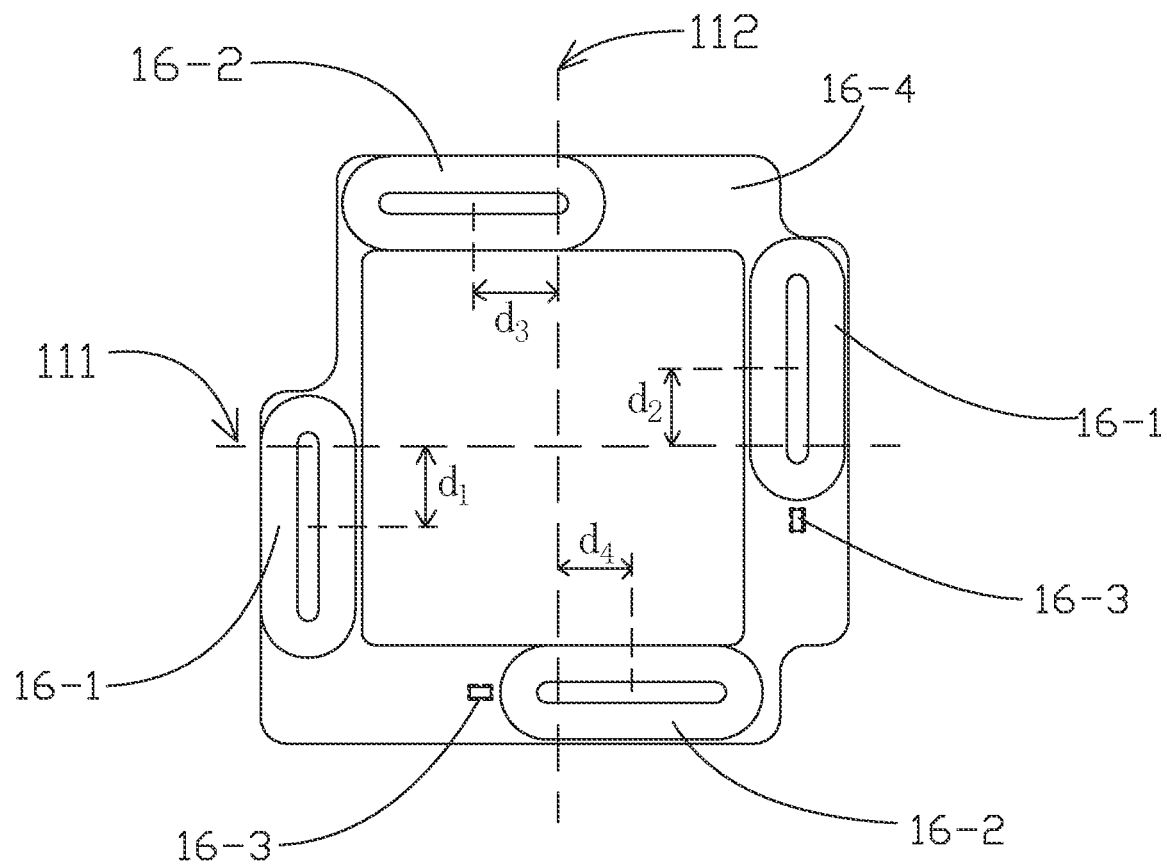
FIG. 3 diagram of a movable frame of an anti-vibration mechanism according to an embodiment of the present disclosure.

As shown in FIG. 3, in an embodiment, the anti-vibration mechanism 10A further includes a conductive support plate 16-4 fixed on the side of the movable frame 11 for the anti-vibration mechanism facing the base 10. The coil 16 for the anti-vibration mechanism and the detection element 16-3 for the anti-vibration mechanism are mounted on the conductive support plate 16-4.

In an embodiment, the conductive support plate 16-4 is electrically connected to the flexible substrate 19 for the anti-vibration mechanism through the movable frame 11 for the anti-vibration mechanism to realize the electrical connection between the coil 16 for the anti-vibration mechanism and the external circuit.

In an embodiment, the projections of the detection element 16-3 for the anti-vibration mechanism and the adjacent coils 16-1 for the first anti-vibration mechanism along the direction of the optical axis 40 are spaced apart from each other and fall into the projection of the magnet 17-1 for the first anti-vibration mechanism along the direction of the optical axis 40, and the projections of the detection element 16-3 for the anti-vibration mechanism and the adjacent coils 16-2 for the second anti-vibration mechanism along the direction of the optical axis 40 are spaced apart from each other and fall into the projection of the magnet 17-2 for the second anti-vibration mechanism along the direction of the optical axis 40.

The anti-vibration mechanism may be provided with two detection elements 16-3 for the anti-vibration mechanism, one of the detection elements 16-3 for the anti-vibration mechanism is located on one side of the coil 16-1 for the first anti-vibration mechanism, and is connected to the first anti-vibration mechanism, and is spaced apart from the coils 16-1. Along the direction of the optical axis 40, the projections of the coil 16-1 for the first anti-vibration mechanism and the adjacent detection element 16-3 for the anti-vibration mechanism are located within the projection of the magnet 17-1 for the first anti-vibration mechanism. The other detection element 16-3 for the anti-vibration mechanism is located on one side of the coil 16-2 for the second anti-vibration mechanism, and is spaced apart from the coil 16-2 for the second anti-vibration mechanism. The projections of the coil 16-2 for the anti-vibration mechanism and the adjacent detection element 16-3 for the anti-vibration mechanism are located within the projection of the magnet 17-2 for the second anti-vibration mechanism. Such a positional relationship facilitates the detection of the magnetic flux of the magnet 17 for the anti-vibration mechanism by the detection element 16-3 for the anti-vibration mechanism, thereby facilitating the realization of the position detection function of the detection element 16-3 for the anti-vibration mechanism.

An embodiment of the present disclosure further provides an camera device, including a focus adjustment mechanism and an anti-vibration device 100. The lens 1 is installed in the focus adjustment mechanism, the anti-vibration device 100 is the aforementioned anti-vibration device 100, and the anti-vibration mechanism in the anti-vibration device 100 is located on the image side of the lens 1.

Figure 8:
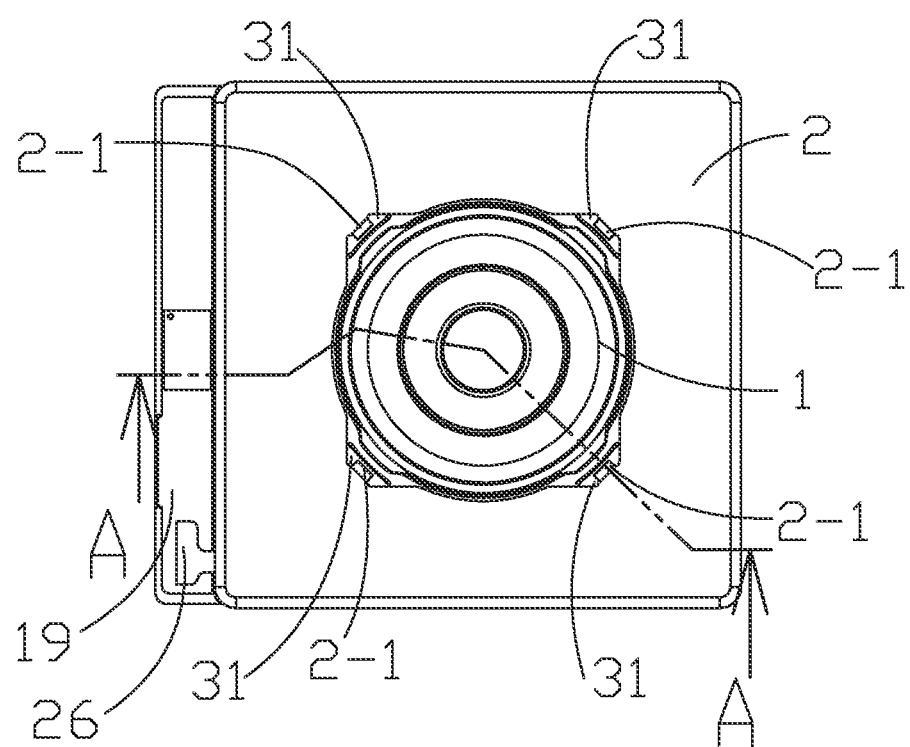
FIG. 8 is a top view of an anti-vibration device according to an embodiment of the present disclosure.
Figure 9:
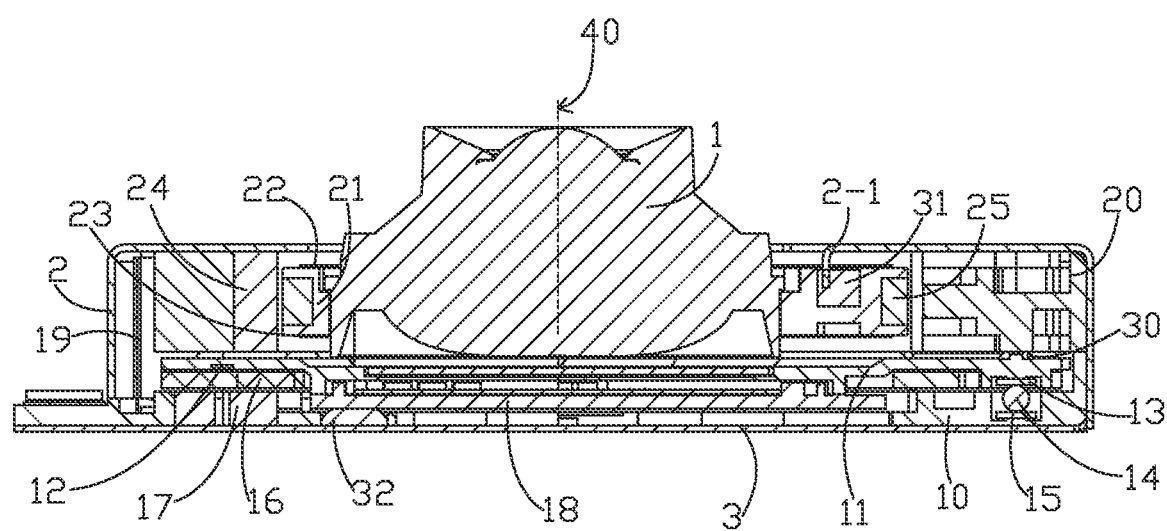
FIG. 9 is a sectional view along A-A direction in FIG. 5.

As shown in FIG. 8 and FIG. 9, in an embodiment, the focus adjustment mechanism is an auto-focus mechanism 20A, and the auto-focus mechanism 20A is provided with a base 20 for the auto-focus mechanism fixed to the housing 60. The lens 1 is mounted on the bracket 21 for auto focus, and the bracket 21 for auto focus can drive the lens 1 to move along the optical axis 40.

The anti-vibration device may also include an auto-focus mechanism 20A. The auto-focus mechanism 20A includes a base 20 for the auto-focus mechanism and an bracket 21 for auto focus. The base 20 for the auto-focus mechanism is fixedly mounted on the housing 2 for auto focus, and the bracket 21 for auto focus is connected to the base 20 for the auto-focus mechanism and movable relative to the base 20 for the auto-focus mechanism. The lens 1 can be accommodated in the bracket 21 for auto focus, and the auto-focus mechanism 20A can also be provided with a magnet 24 for auto focus and a coil 25 for auto focus. The coil 25 for auto focus can interact with the magnet 24 for auto focus to generate a force. Therefore, the free movement of the bracket 21 for auto focus relative to the optical axis 40 can be driven by the acting force, so that the focus alignment function of the anti-vibration device 100 can be realized.

The auto-focus mechanism 20A further includes an upper leaf spring 22 for auto focus and a lower leaf spring 23 for auto focus, and the bracket 21 for auto focus is stably held in the auto-focus position inside the base 20 by the upper leaf spring 22 and the lower leaf spring 23 for auto focus.

The auto-focus mechanism 20A further includes a power-on flexible substrate 26 for auto focus. The power-on flexible substrate 26 for auto focus can be integrated with the flexible substrate 19 for anti-vibration mechanism, thereby facilitating the realization of the auto-focus function of the anti-vibration device 100.

A shock-absorbing gel 30 for the first anti-vibration mechanism can be coated on the movable frame 11 for the anti-vibration mechanism, thereby contributing to the improvement of the overall stability of the anti-vibration mechanism 10A. A shock-absorbing gel 32 for the second anti-vibration mechanism may be applied between the base 10 and the housing 3 for the anti-vibration mechanism. The housing 2 for auto focus is provided with a claw member 2-1 protruding from the housing 2 for auto focus, and the bracket 21 for auto focus may be coated with a shock-absorbing gel 31 for auto focus, and shock-absorbing and buffering is achieved by the shock-absorbing gel 31 for auto focus and the claw member 2-1, which is beneficial to improve the stability of the automatic gathering mechanism 20A.

The bracket 21 for auto focus can also be mounted with a position detection magnet 28 for auto focus, and the energized flexible substrate 26 for auto focus is mounted with a position detection element 27 for auto focus, and the position detection element 27 for auto focus can detect the flux of the position detection magnet 28 for auto focus, so as to detect the accurate position of the bracket 21 for auto focus.

Figure 10:
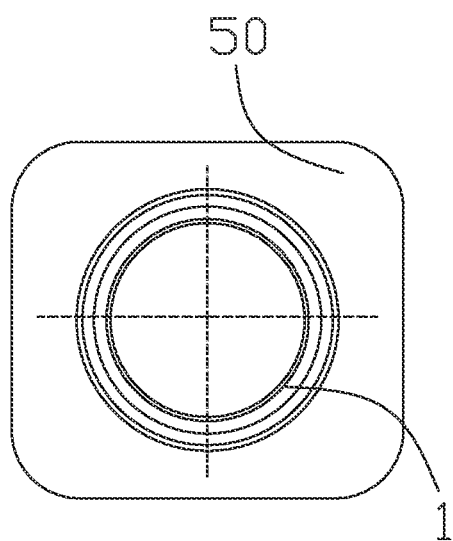
FIG. 10 is a front view of a zoom mechanism according to an embodiment of the present disclosure.
Figure 11:
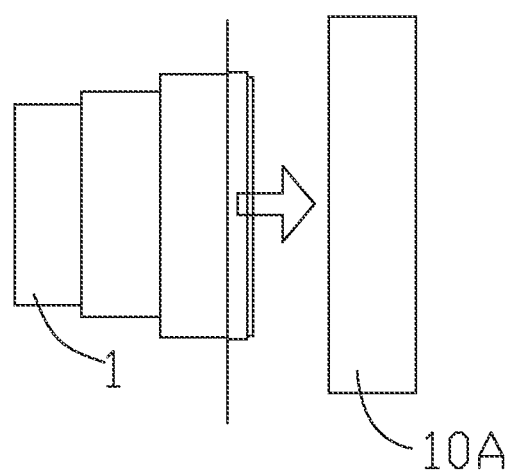
FIG. 11 is a schematic diagram showing lens zooming of a zoom mechanism according to an embodiment of the present disclosure.

As shown in FIG. 10 and FIG. 11, in an embodiment, the focus adjustment mechanism is a zoom mechanism 50, the lens 1 includes at least two lens pieces arranged at intervals along the optical axis, and the zoom mechanism 50 can change the distance of the two lens pieces in the optical axis direction. The lens 1 including multiple lens pieces can move telescopically. By providing the zoom mechanism 50, it is beneficial to improve the photographing effect of the camera device, and to improve the user's experience.

Figure 12:
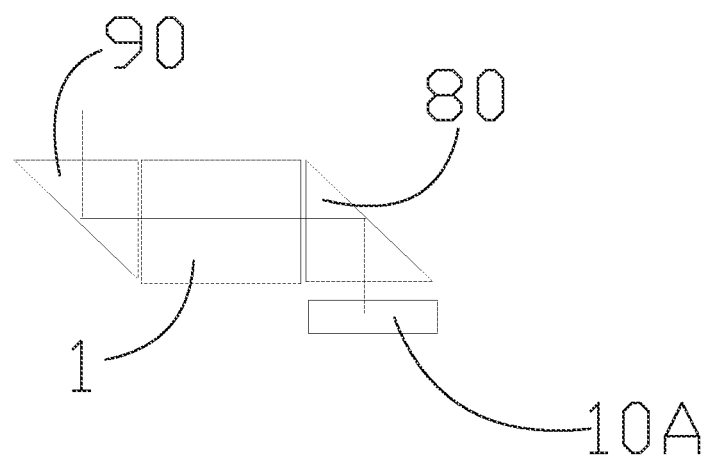
FIG. 12 is a schematic diagram of a first prism and a second prism according to an embodiment of the present disclosure.

As shown in FIG. 12, in an embodiment, the camera device further includes a first prism 80 on the object side of the lens 1 and/or a second prism 90 on the image side of the lens 1. The first prism 80 and the second prism 90 are configured to change the direction of the light path. By arranging the first prism 80 and/or the second prism 90 that can change the optical path, it is beneficial to reduce the volume of the camera device, thereby facilitating the realization of miniaturization and portability of the camera device.

The structure, features, and effects according to the present disclosure are described in detail above based on the embodiments shown in the drawings. The above are only preferred embodiments of the present disclosure. However, the above embodiment do not limit the scope of the present disclosure. Any changes or equivalent embodiments which still do not exceed the concept covered by the specification and illustrations should fall within the protection scope of the present disclosure.

What is claimed is:

1. An anti-vibration device, comprising:
a housing;
a base fixed to the housing; and
an anti-vibration mechanism accommodated within the housing, wherein the anti-vibration mechanism comprises:
a lens mounted on the housing;
a rolling member for the anti-vibration mechanism carried on the base;
a movable frame for the anti-vibration mechanism movably supported on the base via the rolling member for the anti-vibration mechanism;
an image sensor attached to the movable frame for the anti-vibration mechanism; and
an electric actuator comprising a coil for the anti-vibration mechanism attached to the movable frame for the anti-vibration mechanism, and a magnet for the anti-vibration mechanism attached to the base, wherein the magnet for the anti-vibration mechanism is arranged corresponding to the coil for the anti-vibration mechanism to actuate the movable frame for the anti-vibration mechanism to drive the image sensor to move along a first direction and a second direction that are orthogonal to an optical axis, and the first direction is perpendicular to the second direction;
wherein the coil for the anti-vibration mechanism comprises two coils for a first anti-vibration mechanism arranged at intervals along the first direction and two coils for a second anti-vibration mechanism arranged at intervals along the second direction; the movable frame for the anti-vibration mechanism has a first axis parallel to the first direction, geometric centers of the coils for the first anti-vibration mechanism are spaced from the first axis, and two coils for the first anti-vibration mechanisms are in central symmetry with respect to the first axis, and the movable frame for the anti-vibration mechanism has a second axis parallel to the second direction, geometric centers of the coils for the second anti-vibration mechanism are spaced from the second axis, and two coils for the second anti-vibration mechanisms are in central symmetry with respect to the second axis, so that the electric actuator drives the image sensor to rotate in a plane of the first direction and the second direction.

2. The anti-vibration device according to claim 1, wherein the magnet for the anti-vibration mechanism comprises a magnet for the first anti-vibration mechanism arranged corresponding to the coil for the first anti-vibration mechanism, and a magnet for the second anti-vibration mechanism arranged corresponding to the coil for the second anti-vibration mechanism, the electric actuator further comprises a yoke for the anti-vibration mechanism arranged on one side of the movable plate for the anti-vibration mechanism close to the coil for the anti-vibration mechanism and arranged opposite to the magnet for the first anti-vibration mechanism and the magnet for the second anti-vibration mechanism.

3. The anti-vibration device according to claim 1, wherein a first groove is provided on one surface of the base facing the movable frame for the anti-vibration mechanism, a second groove corresponding to the first groove is provided on one surface of the movable frame for the anti-vibration mechanism facing the base, and the rolling member for the anti-vibration mechanism is located in an accommodating space formed by the first groove and the second groove.

4. The anti-vibration device according to claim 2, wherein the anti-vibration mechanism further comprises two detection elements for the anti-vibration mechanism fixed to the movable frame for the anti-vibration mechanism, and the two detection elements for the anti-vibration mechanism are respectively arranged opposite to the magnet for the first anti-vibration mechanism and the magnet for the second anti-vibration mechanism.

5. The anti-vibration device according to claim 4, wherein the anti-vibration mechanism further comprises a flexible substrate for the anti-vibration mechanism, and the flexible substrate for the anti-vibration mechanism is configured to electrically connect the image sensor to an external circuit.

6. The anti-vibration device according to claim 5, wherein the anti-vibration mechanism further comprises a conductive support plate fixed to one side of the movable frame for the anti-vibration mechanism facing the base, and the coils for the anti-vibration mechanism and the detection elements for the anti-vibration mechanism are mounted on the conductive support plate.

7. The anti-vibration device according to claim 6, wherein the conductive support plate is electrically connected to the flexible substrate for the anti-vibration mechanism through the movable frame for the anti-vibration mechanism to electrically connect the coils for the anti-vibration mechanism to an external circuit.

8. The anti-vibration device according to claim 4, wherein projections of the detection element for the anti-vibration mechanism and of adjacent coils for the first anti-vibration mechanism along a direction of the optical axis are spaced apart from each other and fall within a projection of the magnet for the first anti-vibration mechanism along the direction of the optical axis, and projections of the detection element for the anti-vibration mechanism and of adjacent coils for the second anti-vibration mechanism along a direction of the optical axis are spaced apart from each other and fall within a projection of the magnet for the second anti-vibration mechanism along the direction of the optical axis.

9. A camera device, comprising:
an anti-vibration device and a focus adjustment mechanism, wherein the anti-vibration device comprises:
a housing;
a base fixed to the housing; and
an anti-vibration mechanism accommodated within the housing,
wherein the anti-vibration mechanism comprises:
a lens mounted on the housing;
a rolling member for the anti-vibration mechanism carried on the base;
a movable frame for the anti-vibration mechanism movably supported on the base via the rolling member for the anti-vibration mechanism;
an image sensor attached to the movable frame for the anti-vibration mechanism; and
an electric actuator comprising a coil for the anti-vibration mechanism attached to the movable frame for the anti-vibration mechanism, and a magnet for the anti-vibration mechanism attached to the base, wherein the magnet for the anti-vibration mechanism is arranged corresponding to the coil for the anti-vibration mechanism to actuate the movable frame for the anti-vibration mechanism to drive the image sensor to move along a first direction and a second direction that are orthogonal to an optical axis, and the first direction is perpendicular to the second direction;
wherein the coil for the anti-vibration mechanism comprises two coils for a first anti-vibration mechanism arranged at intervals along the first direction and two coils for a second anti-vibration mechanism arranged at intervals along the second direction; the movable frame for the anti-vibration mechanism has a first axis parallel to the first direction, geometric centers of the coils for the first anti-vibration mechanism are spaced from the first axis, and two coils for the first anti-vibration mechanisms are in central symmetry with respect to the first axis, and the movable frame for the anti-vibration mechanism has a second axis parallel to the second direction, geometric centers of the coils for the second anti-vibration mechanism are spaced from the second axis, and two coils for the second anti-vibration mechanisms are in central symmetry with respect to the second axis, so that the electric actuator drives the image sensor to rotate in a plane of the first direction and the second direction,
wherein the lens is further mounted on the focus adjustment mechanism; and
wherein the anti-vibration mechanism in the anti-vibration device is located on an image side of the lens.

10. The camera device according to claim 9, wherein the focus adjustment mechanism is an auto-focus mechanism provided with a base for the auto-focus mechanism and a bracket for auto focus that is movably connected to the base for the auto-focus mechanism; and
the lens is mounted on the bracket for auto focus, so that the bracket for auto focus drives the lens to move in the direction of the optical axis.

11. The camera device according to claim 9, wherein the focus adjustment mechanism is a zoom mechanism, the lens comprises at least two lens pieces arranged at intervals along the direction of the optical axis, and the zoom mechanism is capable of changing a distance between any two lens pieces along the direction of the optical axis.

12. The camera device according to claim 9, further comprising a first prism on an object side of the lens and/or a second prism on an image side of the lens, and the first prism and the second prism are configured to change a direction of a light path.

* * * * *